Patented Apr. 30, 1940

2,199,046

UNITED STATES PATENT OFFICE 2,199,046

ART OF MAKING LIGHTWEIGHT CONCRETE

Sydney T. Evenstad, Alhambra, Calif., assignor to William F. MacGlashan, Pasadena, Calif.

No Drawing. Application May 11, 1932, Serial No. 610,714

7 Claims. (Cl. 106—24)

In general my invention can be applied most advantageously to a process for making concrete and concrete aggregate, disclosed in part by Harding, Hayde, Boynton, Kraus, and others, and has to do with the over firing of clay shale to produce a vesicular burned clay product of a size suitable for an aggregate in concrete made from Portland cement and water, although the principles may be applied to any similar product requiring a like cycle of treatment.

In producing vesicular over fired clay aggregate for concrete, the problem resolves itself into one of two alternatives: (1) the raw clay or shale can be over fired (in a rotary kiln, for example) to a clinker-like character, and subsequently crushed and screened to size, or (2) the raw clay can be pre-formed to a size, over fired without clinkering and delivered ready for use. The former is easily accomplished, but the crushed product is inferior to the latter, which may be produced as suggested by Harding—coating an inflatable clay pellet with a refractory ceramic coating. The refractory ceramic coating prevents the clinkering or sintering of the several separate pre-formed clay shapes prior to and during the firing. Moreover, the operations of crushing and screening are eliminated, together with excessive fines resulting from the former scheme.

I have invented a way to accomplish this end in a novel fashion. In practicing my invention I prefer to prepare raw clay as customary by those skilled in the art, and pre-form the aggregate to pellets of suitable sizes. Plastic clay of a character suitable for carrying out my invention contains enough water to deform easily. If the clay nodules or pellets are handled in ordinary fashion, they lose their identity, being soft enough to stick together, during the operations of handling and storage subsequent to formation. As disclosed by Harding, the integrity of the separate particles can be maintained by a refractory coating. I have discovered, however, that a coating of ordinary non-refractory clay will suffice for this purpose, provided the clay is dry. Moreover, I can prevent the balling or agglomeration or nodulizing or clinkering of the pellets by merely drying the surface of the same without any added coating whatever. I prefer ordinarily to accomplish this drying by an air blast. I can, however, use an absorbent material such as wood flour, peat moss, oat hulls, kieselguhr, or the like; which, dusted on the pellets immediately after formation, serves to absorb the water from the surface layer, accomplishing at once two objects: the pellets are prevented from agglomeration, and they are maintained with an interior moisture content especially suitable for subsequent heat treatment and inflation. I would not, however, limit my invention to a specified moisture content of either pellets or absorbent. If I form clay pellets by a process, involving lower moisture content of the particles with lesser plasticity this permits the making of aggregate for concrete, even more readily, as the adjustment of operations is less difficult.

Still another way in which I can practice my invention may be described as follows: The raw pellets, immediately after formation, are covered with a fluid relatively immiscible in water; for example, a mineral oil or emulsion, acid sludge, oil or tar. This coating prevents agglomeration of the pellets and after charging them to a rotary kiln the continued movement of the kiln and the pellets serves to prevent clinkering with consequent loss of individual integrity of the particles. Organic and combustible matter is eliminated by burning during the heat treatment of the material.

Where practical I charge pellets shortly after their formation from the raw plastic clay into one end of a rotary kiln. Hot gases and products of combustion from the firing end of the kiln coming in contact with the pellets accomplish the purposes of my invention, in an economical fashion. Where it has been heretofore thought necessary to coat pellets with a refractory ceramic exterior layer, I find that my technique, as described above, permits the production of a vesicular lightweight aggregate, composed of a multiplicity of more or less similar particles of burned inflated clay, the distinguishing characteristics of which are: they are of substantially one class of mineral matter; the interior of the several particles is vesicular and foraminous; the exterior surface is substantially continuous and relatively smooth, being composed of substantially the same ultimate mineral material throughout, except in minor amount although in different states of oxidation or chemical combination, as to the surface and interior respectively.

With some particular classes of clay and shale it may, on occasion, be desirable to use admixtures such as tannery waste, beet pulp washings, iron ore, lime, and fluxes. Some shale also contains too small a quantity of natural organic carbon to over fire easily at low temperatures. I prefer to add hydrocarbon oil or mineral oil emulsions to such clays. I have found that ground coke, carbon and the like are apt to promote agglomeration and clinkering, but I would not limit my invention to any specific composition of matter. An optimum combination of operations would involve mixing and tempering raw ground clay or shale with hydrocarbon oil or emulsions and water; pre-forming the plastic mass into pellets of a size suited to the desired product, preserving the integrity of the several pellets without the addition of a coating and/or changing the surface character thereof, subsequent to the forming operation, and thereafter heat treating the mass in bulk maintaining the while, save momentarily, the mobility of the individual pieces, causing the particles to inflate and the interior to assume a vesicular structure substantially as described, and thereafter making therefrom a concrete, with a cement.

Workers in this field have heretofore sought an aggregate light in weight, with little regard to other characteristics. For example, clay pellets, formed from a raw dry clay weighing as much as 110 pounds per cubic foot, approximating ¼" in diameter, when over fired progressively to a temperature of 2050° F. over a period of from eight to fifteen minutes will weigh in bulk about 20 pounds per cubic foot and range from ⅜ to ½ inch in diameter. This would be classed as coarse aggregate. I have found it practical, however, to produce a pellet particle considerably smaller than ⅟₁₆ inch in diameter. Firing this product results in a final aggregate practically all of which passes a ⅛ inch screen and weighs in bulk approximately fifty-five pounds per cubic foot, and is classed as fine aggregate. The principal reason for this increase in weight lies in the greater proportion of the mass occupied by the surface of the pellet which has not been vesiculated. Obviously, it would be impractical to attempt to coat small particles or cover them with an absorbent material because of the large surface area involved. The only way matter of this kind can be produced, so far as I know, is in accord with the principles of my invention, as described above, preventing agglomeration and clinkering and permitting the production of an aggregate substantially of the weight desired with consequent retention of strength; balancing in this way the factors of weight, size, strength, and surface character of the aggregate.

I consider that my invention embodies the fundamental idea of forming, surface drying, and heat treating particles of clay or shale of substantially uniform composition in such a fashion as to vesiculate the interior while vitrifying or sintering the exterior, the heat treatment being accomplished while the particles are in relative motion, each to the other, save momentarily, and conglomerating the aggregate with mineral matter in a Portland cement matrix.

The special utility of my invention lies in its application to the production, not alone of an aggregate of the characteristics above described, but from a more fundamental standpoint a concrete comprising the aggregate, a cement matrix and water, with or without other mineral matter.

In reducing my inventions to practice during the past twenty-two months, I have produced commercial quantities of both aggregate and concrete as described above and I believe that others acquainted with the art can easily do likewise in the light of the above disclosures I have made. As used in this specification the term plastic has the meaning of "being capable of being molded into a desired form" while argillaceous means "containing or consisting of clay; or of the nature of or like clay; clayey." (Funk & Wagnalls New Standard Dictionary of the English language.) A representative group of argillaceous materials is listed on page 365 of Rogers, Manual of Industrial Chemistry, 5th edition, vol. I (D. Van Nostrand Company, 1931.)

What I claim is:

1. An improvement in the art of making lightweight concrete aggregate, which comprises coating plastic clay composition pellets with a coating of material substantially removable by heat, heat treating the same in bulk at a temperature sufficient to vesiculate the pellets, the while maintaining the integrity of the individual pieces, said heat treatment removing the coating so that the aggregate will be of substantially uniform composition throughout.

2. An improvement in the art of making lightweight concrete aggregate, which comprises coating moist plastic clay pellets with a relatively dry clay coating of the same general composition and character, save moisture content, and heat treating the same in bulk at a temperature sufficient to vesiculate the pellets, while maintaining the integrity of the individual pieces.

3. An improvement in the art of making lightweight concrete aggregate, which comprises coating plastic clay composition pellets with a substance selected from the group consisting of mineral oil, emulsion, tar, or oil, heat treating the same in bulk while maintaining the integrity of the individual pieces.

4. An improvement in the art of making lightweight concrete aggregate, which comprises surface drying plastic clay composition pellets containing moisture by means of a blast of gas, heat treating the same in bulk while maintaining the integrity of the individual pieces.

5. An improvement in the art of making lightweight aggregate for concrete, which comprises surface drying to a substantial extent plastic clay composition pellets containing moisture, by subjecting the same to the action of solid absorbent matter, heat treating the same in bulk while maintaining the integrity of the individual pieces.

6. A process of making a lightweight argillaceous aggregate material that comprises forming pellets of a plastic material containing an argillaceous substance and a substance that will give off a gas wheat heated, forming on the outside of each pellet a surface having substantially less tendency to adhere to adjacent pellets than the original surface, said surface being convertible by heat into substantially the same composition as the remainder of the pellet, heating a plurality of the pellets while in contact with each other to a temperature sufficient to partially fuse and vesiculate the pellets and to convert the surface of the pellets into substantially the same composition as the interior thereof, agitating the plurality of pellets meanwhile to aid in preventing substantial adherence therebetween.

7. A process of making a lightweight argillaceous aggregate material that comprises forming pellets of a plastic material containing an argillaceous substance and a hydrocarbon oil and water, forming on the outside of each pellet a surface having substantially less tendency to adhere to adjacent pellets than the original surface, said surface being convertible by heat into substantially the same composition as the remainder of the pellet, heating a plurality of the pellets while in contact with each other to a temperature sufficient to partially fuse and vesiculate the pellets and to convert the surface of the pellets into substantially the same composition as the interior thereof, agitating the plurality of pellets meanwhile to aid in preventing substantial adherence therebetween.

SYDNEY T. EVENSTAD.

CERTIFICATE OF CORRECTION.

Patent No. 2,199,046. April 30, 1940.

SYDNEY T. EVENSTAD.

It is hereby certified that error appears in the printed specification of the above numbered patent requiring correction as follows: Page 2, second column, line 56, claim 6, for the word "wheat" read --when--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.